United States Patent [19]

Berg et al.

[11] Patent Number: 4,927,607
[45] Date of Patent: May 22, 1990

[54] NON-CYLINDRICAL REACTOR FOR CARBON BLACK PRODUCTION

[75] Inventors: Alan C. Berg; William R. Jones, Jr., both of Monroe, La.

[73] Assignee: Columbian Chemicals Company, Atlanta, Ga.

[21] Appl. No.: 142,478

[22] Filed: Jan. 11, 1988

[51] Int. Cl.$^5$ .................. B01J 10/00; C09C 1/48
[52] U.S. Cl. ..................... 422/150; 422/151; 423/457
[58] Field of Search ............... 422/150–158; 423/455–457

[56] References Cited

U.S. PATENT DOCUMENTS

| | | | |
|---|---|---|---|
| 2,705,190 | 3/1955 | Heller | 422/151 |
| 2,769,692 | 11/1956 | Heller | 422/151 |
| 3,490,869 | 1/1970 | Heller | |
| 3,490,870 | 1/1970 | De Land | |
| 3,522,005 | 7/1970 | Braddock | |
| 3,563,706 | 2/1971 | Gunnell | |
| 3,592,597 | 7/1971 | Krejci | |
| 3,615,210 | 10/1971 | Jordan et al. | |
| 3,726,964 | 4/1973 | Krejci | |
| 3,787,562 | 1/1974 | Heller et al. | |
| 3,832,450 | 8/1974 | Wiggins | |
| 3,867,513 | 2/1975 | Krejci | |
| 3,922,335 | 11/1975 | Jordan et al. | |
| 3,959,008 | 5/1976 | Warner et al. | |
| 3,988,478 | 10/1976 | Wiggins | |
| 4,195,068 | 3/1980 | Rothbühr et al. | |
| 4,246,232 | 1/1981 | Posch | 422/156 |
| 4,283,378 | 8/1981 | Yates et al. | |
| 4,342,736 | 8/1982 | Estopinal | |
| 4,370,308 | 1/1983 | Williams et al. | |
| 4,391,789 | 7/1983 | Estopinal | |

FOREIGN PATENT DOCUMENTS

| | | |
|---|---|---|
| 811058 | 4/1969 | Canada |
| 811653 | 4/1969 | Canada |
| 821460 | 8/1969 | Canada |
| 827569 | 11/1969 | Canada |
| 827577 | 11/1969 | Canada |
| 828064 | 11/1969 | Canada |
| 828065 | 11/1969 | Canada |
| 835289 | 2/1970 | Canada |
| 842123 | 5/1970 | Canada |
| 876015 | 7/1971 | Canada |
| 911684 | 10/1972 | Canada |
| 922491 | 3/1973 | Canada |
| 928936 | 6/1973 | Canada |
| 967724 | 5/1975 | Canada |
| 977622 | 12/1964 | United Kingdom |

*Primary Examiner*—Michael S. Marcus
*Attorney, Agent, or Firm*—Jones, Askew & Lunsford

[57] ABSTRACT

A non-cylindrical carbon black reactor for consistently and efficiently producing high tint carbon black. A plurality of flat sides defines the inner surface of the carbon black reactor. The flat sides provide a planar surface for the introduction of feedstock hydrocarbon into the reactor, thereby eliminating or substantially reducing impingement of the feedstock hydrocarbon on the inner surface of the reactor chamber and the consequent erosion of the inner surface. The flat sides of the inner surface of the reaction chamber also provide a hot gas flow with a cross-sectional area that substantially conforms to the spray pattern of the feedstock hydrocarbon, thereby providing a minimum flame length within the reactor and a more efficient use of hot gas.

10 Claims, 1 Drawing Sheet

NON-CYLINDRICAL REACTOR FOR CARBON BLACK PRODUCTION

TECHNICAL FIELD

The present invention relates to reactors for the production of carbon black, and more particularly relates to a more efficient carbon black reactor which consistently provides a high-tint carbon black.

BACKGROUND OF THE INVENTION

The basic method for production of carbon black has been known for some time. Generally, carbon black is produced by injecting a hydrocarbon raw material (hereinafter called "feedstock hydrocarbon") into a flow of hot oxygen-containing gas wherein the feedstock hydrocarbon is partially pyrolyzed before being quenched by a water spray. The hot gas is produced by burning a fuel in a combustion chamber. The combustion chamber is interconnected axially with a cylindrical reaction chamber and the hot gas produced in the combustion chamber flows through the reaction chamber, where the feedstock hydrocarbon is introduced into the flow of hot gas.

The feedstock hydrocarbon may be introduced into the flow of hot gas from an axial locus within the reaction chamber, or through the wall of the reaction chamber. It is often preferred to introduce the feedstock hydrocarbon through the wall of the reaction chamber because the axial injection apparatus interferes with the flow of the hot gas from the combustion chamber. As the flow of hot gas carries the feedstock hydrocarbon, the feedstock hydrocarbon is pyrolyzed to form carbon black and gaseous by-products. The pyrolysis reaction is then quenched by a spray of water. Finally, the carbon black is separated from the gas flow.

The physical properties of carbon black may be varied by controlling the process parameters of the carbon black reactor. For example, "tint" is an important property of carbon black. The particle size distribution of the carbon black affects the tint. A narrow particle size distribution gives a high-tint carbon black which imparts improved skid and traction qualities to rubber. The temperature and amount of the hot gas from the combustion chamber, the amount and distribution of feedstock hydrocarbon in the flow of hot gas, the flow pattern of hot gas and feedstock hydrocarbon through the reactor, the residence time of the feedstock hydrocarbon in the carbon black reactor, the flame length of the pyrolyzing reaction, and the amounts of impurities are parameters that affect the particle size distribution of the carbon black. These process parameters must be controlled in order to control the particle size distribution of the carbon black product.

Prior art carbon black reactors generally have cylindical reaction chambers. The temperature and amount of the hot gas from the combustion chamber can be controlled by the amount and type of fuel and the amount of air used for combustion. The amount of feedstock hydrocarbon entering the flow of hot gas can be controlled by a simple valve mechanism, but the remaining parameters of the carbon black process can be difficult to control with the cylindical reactor. One way to attempt to control the residence time of the pyrolyzing feedstock hydrocarbon in the reactor is to move the point of introduction of the feedstock hydrocarbon along the longitudinal axis of the reaction chamber. The closer the point of introduction of the feedstock hydrocarbon to the combustion chamber, the longer the residence time of the feedstock hydrocarbon.

When the feedstock hydrocarbon is introduced through the walls of the reaction chamber, the residence time is difficult to control. Moreover, as the feedstock hydrocarbon is introduced through the walls of a cylindrical reaction chamber, the feedstock hydrocarbon tends to impinge on the inner surface of the cylindrical reaction chamber around the point of introduction of the feedstock hydrocarbon. The temperature of the hot gas within the reaction chamber and thus the temperature of the curved inner surface of the reaction chamber range from 2000° Fahrenheit to 3500° Fahrenheit. The temperature of the feedstock hydrocarbon at the point of introduction is generally 350° Fahrenheit. If the feedstock hydrocarbon is preheated to a much higher temperature it is turned into coke. Because of this extreme difference in temperatures, the impingement of the feedstock hydrocarbon on the inner surface of the reaction chamber causes thermal shock to the reaction chamber. The thermal shock erodes the inner surface of the reaction chamber and widens the cross sectional area of the reaction chamber. The eroded portion of the inner surface of the reaction chamber produces an impurity in the carbon black product called refractory grit. Another detrimental effect of the impingement of the feedstock hydrocarbon on the inner surface of the reaction chamber is an impurity called impingement coke, which is a result of the feedstock hydrocarbon contacting the high-temperature surface of the reactor. Impingement coke is a hard carbon substance with a particle size much larger than high tint carbon black.

Because of the widened cross section of the reaction chamber due to erosion, the volume of the reaction chamber becomes increased and consequently the residence time of the flow of hot gas and pyrolyzing feedstock hydrocarbon becomes increased as the reactor operates. This increased residence time provides for more reaction time and thus alters the particle size distribution of the carbon black product. The longer the residence time of the feedstock hydrocarbon, the larger the average particle size of the product. The presence of refractory grit and impingement coke in the carbon black product also affects the particle size distribution and overall quality of the carbon black. The quality and particle size control thus degrades with time as the conventional cylindrical reactor operates.

Another problem with the cylindrical prior art carbon black reactors is the inability of the feedstock hydrocarbon sprays to cover the cross sectional area of the hot gas flow when the feedstock hydrocarbon is introduced through the walls of the reaction chamber. When the feedstock hydrocarbon is sprayed into the reaction chamber through the walls of the reaction chamber, a non-circular spray pattern is formed. The cross section of the cylindrical reactors is circular and, therefore, the cross section of the hot gas flow through the cylindrical reaction chamber is also circular. Because the non-circular pattern formed by the feedstock hydrocarbon sprays does not match the circular cross section of the hot gas flow, portions (hereinafter called void hot gas) of the hot gas flow remain void of feedstock hydrocarbon spray even after the feedstock hydrocarbon has been introduced. The presence of void hot gas has detrimental effects on the carbon black process. First, the void hot gas increases the flame length of the pyrolyzing feedstock hydrocarbon. The flame of the pyrolyzing feedstock hydrocarbon begins with the injection of the feedstock and ends when the oxygen in the hot gas flow is consumed. The oxygen remaining in the void hot gas is not consumed until the oxygen contacts the feedstock hydrocarbon. This often does not occur until the void hot gas is further down stream, thus elongating the flame of the pyrolyzing feedstock hydrocarbon. The void hot gas over-pyrolyzes some of the feedstock hydrocarbon, thereby broadening the particle size distribution of the carbon black product. Moreover, some of the void hot gas escapes without ever contacting the feedstock hydrocarbon and is wasted.

Therefore, there is a need for a carbon black reactor which provides greater control over the parameters of the carbon black reaction process and consistently produces a carbon black with a narrow particle size range.

SUMMARY OF THE INVENTION

The present invention solves the above-described problems in the prior art by providing a non-cylindrical reactor for carbon black production. Generally described, the reaction chamber of the present invention has a non-circular cross-section and introduces a plurality of hydrocarbon sprays into the reaction chamber to form a non-circular spray pattern at the cross section of the reaction chamber. The reaction chamber produces a flow of hot gas having a cross section which conforms substantially to the non-circular cross section of the spray pattern, so as to maximize coverage of the cross sectional area of the hot gas flow by the hydrocarbon spray.

Stated somewhat more specifically, the reaction chamber of the present invention has an outer shell with a plurality of flat sides defining an inner surface of the reaction chamber. The devices for introducing hydrocarbon sprays into the reaction chamber are positioned on the flat sides of the reaction chamber. When the hydrocarbon spray devices are so positioned, the sprays overlap to form a spray pattern with a cross section which substantially conforms to the cross section of the hot gas flow, thus maximizing coverage of the cross section of the hot gas flow by the hydrocarbon spray.

The novel construction of the present invention produces a carbon black with a high tint quality. The maximum coverage of the cross sectional area of the hot gas flow by the hydrocarbon spray results in a minimum flame length. The minimum flame length causes a uniform pyrolysis of the hydrocarbon spray, which gives a narrow particle size distribution, or high tint, in the carbon black product. The maximum coverage of the crosssectional area of the hot gas flow also eliminates the presence of void hot gas and the waste thereof.

The novel construction of the present invention provides a carbon black reactor which operates with reduced impingement of the feedstock hydrocarbon spray. The flat sides of the inner surface of the reaction chamber provide a planar surface surrounding the outlet port of each of the hydrocarbon introducing devices so as to substantially eliminate impingement of the hydrocarbon sprays on the inner surface of the reaction chamber, thereby substantially eliminating thermal shock and consequent erosion of the inner surface of the reaction chamber. Without the erosion of the inner surface of the reaction chamber, the cross sectional area of the reaction chamber remains constant and consequently the residence time of the flow of hot gas and pyrolyzing feedstock hydrocarbon remains constant. The constant flow of hot gas and feedstock hydrocarbon provides for greater control over the resulting tint quality of the carbon black product. The substantial elimination of the impingement of the hydrocarbon sprays also eliminates the presence of refractory grit and impingement coke in the carbon black product, which reduces erosion and results in a more narrow and consistent particle size distribution of the carbon black and improves the overall quality of the carbon black.

Therefore, it is an object of the present invention to provide an improved carbon black reactor.

It is another object of this invention to provide a carbon black reactor that produces a carbon black with a consistently narrow particle size range, or high tint.

It is another object of the present invention to provide a carbon black reactor that achieves substantially complete coverage of the cross sectional area of the hot combustion gas by the feedstock hydrocarbon.

It is another object of the present invention to provide a carbon black reactor that produces a minimum flame length.

It is another object of the present invention to provide a carbon black reactor that produces a constant flow of hot combustion gas and feedstock hydrocarbon.

It is another object of the present invention to provide a carbon black reactor that substantially reduces or eliminates thermal shock and erosion of the inner surface of the carbon black reactor caused by impingement of the feedstock hydrocarbon.

It is another object of the present invention to provide a carbon black reactor that substantially reduces or eliminates refractory grit in the carbon black product.

It is another object of the present invention to provide a carbon black reactor that sustantially reduces or eliminates impingement coke in the carbon black product.

It is a further object of the present invention to provide a carbon black reactor that substantially reduces or eliminates the waste of hot combustion gases in the production of carbon black.

Other objects, features, and advantages will become apparent from reading the following specifications in conjunction with the accompanying drawings.

DETAILED DESCRIPTION OF PREFERRED EMBODIMENT

Figure 1:
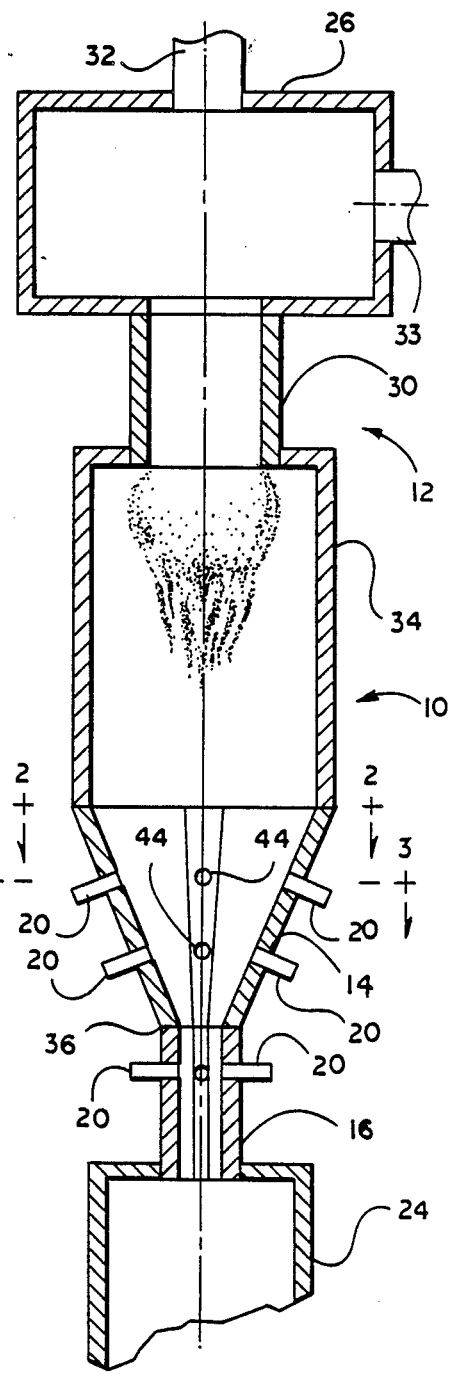
FIG. 1 is a sectional longitudinal plan view of the preferred embodiment of the present invention.

Looking first to FIG. 1, there is shown generally at 10 a carbon black reactor generally comprising a combustion section 12, a reaction chamber 14 connected to the combustion section, a reaction throat 16 connected to an end of the reaction chamber, a plurality of feedstock hydrocarbon injection nozzles 20 entering the reaction chamber and the reaction throat, and an exit chamber 24 connected to an end of the reaction throat. The combustion section comprises a cylindrical air inlet chamber 26 interconnected axially with a combustion choke 30. The air inlet chamber 26 has an inlet opening 32 for the introduction of a hydrocarbon burner and a second opening for an oxygen-containing gas 33. The combustion choke 30 is likewise interconnected axially with a cylindrical combustion chamber 34. It should be understood that the details of the combustion section 12 are known to those skilled in the art and therefore are not discussed in detail.

The combustion chamber 34 is interconnected axially with a converging, eight-sided reaction chamber 14. The reaction chamber 14 converges in the direction away from the combustion chamber 34. The small end 36 of the converging eight-sided reaction chamber 14 is interconnected axially with an eight-sided reaction throat 16.

Figure 2:
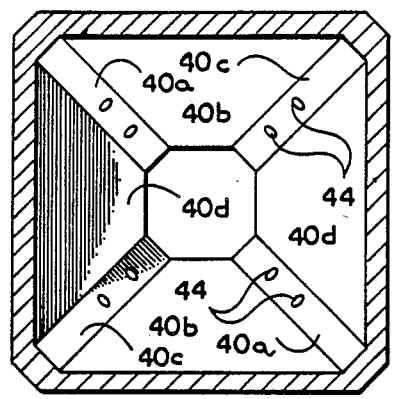
FIG. 2 is an enlarged sectional view taken along line 2—2 of FIG. 1, showing the inner surface of the reaction chamber in the disclosed embodiment.

The inner surface of the eight-sided reaction chamber is shown in FIG. 2. An important feature of the preferred embodiment is the flat walls 40a, 40b, 40c, and 40d of the reaction chamber 14 shown in FIG. 2. The eight sides of the reaction chamber 14 are positioned in parallel opposing pairs 40a, 40b, 40c and 40d. Feedstock hydrocarbon injection nozzle ports 44 are located on relatively narrow alternating pairs of sides 40a and 40c of the reaction chamber 14 and the corresponding alternating pairs of sides (not shown) of the reaction throat 16. The pairs of flat sides 40a and 40c provide a planar surface for the feedstock hydrocarbon injection nozzle ports 44. It is preferable to position the feedstock hydrocarbon injection nozzle ports 44 flush with the planar surface of the flat sides 40a and 40c. Each feedstock injection nozzle port 44 forms a feedstock hydrocarbon spray with a 90° spray angle. The inner surface of the reaction throat 16 is identical to the cross section of the reaction chamber 14, except that the reaction throat 16 does not converge. The reaction throat 16 is interconnected axially to the exit chamber 24, which has a significantly larger diameter than the reaction throat 16.

The carbon black production process begins in the combustion section 12 of carbon black reactor 10 where a hydrocarbon material such as natural gas is mixed with an oxygen-containing gas such as air and combusted. A quantity of oxygen-containing gas in excess of the amount necessary for complete combustion of the hydrocarbon fuel is introduced into the air inlet chamber 26. The hot gas produced in the combustion section 12 flows axially through the combustion section towards the reaction chamber 14. The temperature of the hot gas generally ranges from 2000° Fahrenheit to 3500° Fahrenheit. As the hot combustion gas flows axially through the reaction chamber 14 into the reaction throat 16, a feedstock hydrocarbon is sprayed into the flow of hot gas by the injection nozzles 20 through the injection ports 44 located along the walls of the reaction chamber 14 and reaction throat 16. The feedstock hydocarbon spray is pyrolyzed in the flow of hot gases and forms carbon black particles. The carbon black particles suspended in the flow of hot gas are carried into the exit chamber where the pyrolyzing reaction is quenched by a spray of water (not shown). The carbon black particles are then separated from the flow of gases. It should be understood that the carbon black product recovery is not a part of this invention and thus is not discussed in detail.

The planar surfaces of the flat sides 40a and 40c substantially eliminates impingement of the feedstock hydrocarbon on the inner surface of the reaction chamber 14 that occurs in the prior art cylindrical reaction chambers as the feedstock hydrocarbon is injected into the flow of hot gas. The elimination of the feedstock hydrocarbon impingement eliminates the thermal shock of the inner surface of the reaction chamber 14 and the consequent erosion of the inner surface of the reaction chamber 14. The elimination of the impingement of the feedstock hydrocarbon also eliminates the presence of refractory grit and impingement coke in the carbon black product. Without the erosion of the inner surface of the reaction chamber 14, the dimensions of the reaction chamber cross section (shown in FIG. 3) remain constant and thus the rate of flow of hot gas through the reaction chamber 14 remains constant. With a constant flow rate of hot gas through the reaction chamber 14 and throat 16, the particle size distribution of the carbon black product can be controlled by selecting a particular set of feedstock hydrocarbon injection nozzles 20 along the reaction chamber 14 and throat 16.

Figure 3:
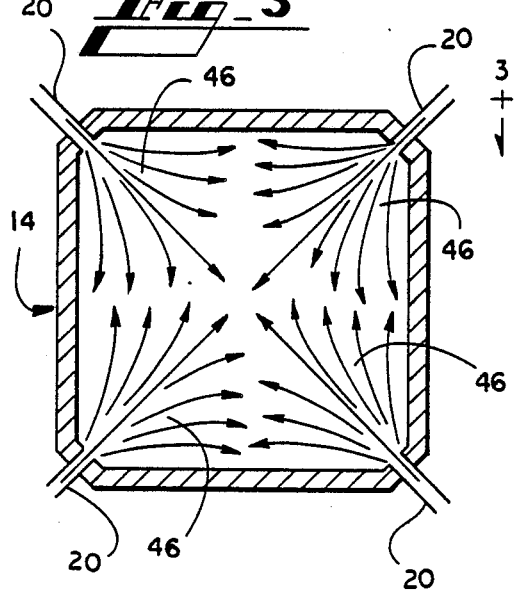
FIG. 3 is an enlarged schematic section view taken along line 3—3 of the width of the reaction chamber of the disclosed embodiment, illustrating the flow pattern produced by the feedstock hydrocarbon sprays.

Another novel aspect of the carbon black reactor 10 is the substantially rectangular cross section of hot combustion gas produced by the eight-sided reaction chamber design. FIG. 3 shows the cross-section of the width of the reaction chamber 14 illustrating the flow pattern produced by the feedstock hydrocarbon sprays. Each feedstock hydrocarbon injection nozzle 20 forms a feedstock hydrocarbon spray with a 90° spray angle within the reaction chamber. With one set of four feedstock hydrocarbon injection nozzles 20 spraying simultaneously, a rectangular spray pattern is formed by the overlapping 90° sprays 46. The rectangular pattern of the feedstock hydrocarbon spray substantially conforms to the rectangular cross section of the hot combustion gas flow. As a result, the coverage of the cross sectional area of the flow of hot combustion gas by the feedstock hydrocarbon spray is maximized.

The maximum coverage of the cross sectional area of the flow of hot combustion gas by the feedstock hydrocarbon provides several advantages over the prior art. First, by maximizing the coverage of the cross sectional area, the flame length of the pyrolyzing feedstock hydrocarbon is minimized. The flame is produced by the pyrolysis reaction between the oxygen in the hot gas and the feedstock hydrocarbon spray. The flame produced by the pyrolyzing feedstock hydrocarbon ends when all of the oxygen contained in the hot combustion gas is consumed. When the feedstock hydrocarbon spray covers substantially the entire cross-sectional area of the hot gas flow, substantially all of the oxygen in the hot gas flow immediately contacts feedstock hydrocarbon as the hot gas flow passes the point of injection of the feedstock hydrocarbon. As a result, substantially all of the oxygen quickly and uniformly reacts with the feedstock hydrocarbon and the flame ends. This aspect of the present carbon black reactor prevents the undesirable consequences of void hot gas, which otherwise occurs wen less than full coverage of the cross sectional area of the hot gas flow is obtained (as with the cylindrical reactor). Conseqently, the present reactor avoids over-pyrolyzing some of the feedstock hydrocarbon and maintains a desirable narrow particle size distribution of the carbon black product.

A particular advantage of the minimum flame length produced by the carbon black reactor 10 is that the flame of the pyrolyzing feedstock hydrocarbon is kept within the reaction chamber 14 and throat 16, thereby assuring uniform reaction conditions. Because of the large and immediate increase in diameter as the pyrolyzing feedstock enters the exit chamber 24 from the throat 16, the hot gas undergoes rapid expansion and backmixing. If the flame continues into the exit chamber, the rapid expansion and backmixing causes not-uniform contact of the oxygen in the hot gas with the feedstock hydrocarbon and consequent over-pyrolyzing of portions of the feedstock hydrocarbon. Another advantage of the maximum coverage of the cross sectional area of the flow of hot combustion gas is that substantially all of the hot gas produced by the combustion chamber is used in the pyolyzing reaction, thereby eliminating the waste of any void hot gas that might otherwise escape through the exit chamber 24.

It should be understood that increased coverage of the cross sectional area of the hot gas flow and resulting benefits can be obtained to varying degrees with feedstock hydrocarbon spray angles between 30° and 120°. At broader angles it is necessary for the feedstock hydrocarbon injection nozzles to extend beyond the inner surface of the reactor so the feedstock hydrocarbon spray does not impinge on the inner surface as the feedstock hydrocarbon is injected.

It should also be understood that the present carbon black reactor is not limited to a reaction chamber and throat with eight sides, and that reactor chambers and throats with a lesser or greater number of sides are contemplated.

It should further be understood that the foregoing relates only to a preferred embodiment of the present invention, and that numerous changes and modifications therein may be made without departing from the spirit and scope of the invention as defined in the following claims.

We claim:

1. Apparatus for the production of carbon black, comprising:
    means for producing a flow of hot gas;
    a reaction chamber having an inlet opening receiving the flow of hot gas and having an outlet opening so that the hot gas can flow through the reaction chamber,
    means positioned between the inlet opening and the outlet to opening of the reaction chamber for introducing a plurality of feedstock hydrocarbon sprays into the reaction chamber substantially transversely to the hot gas flow to form a non-circular feedstock hydrocarbon spray pattern at a cross-section of the reaction chamber; and,
    said reaction chamber being shaped and said spray means being positioned within the reaction chamber such that the feedstock hydrocarbon spray pattern formed extends substantially across the entire cross-sectional flow area of the reaction chamber and is not circular in cross-section, so as to maximize coverage of the cross-sectional area of the hot gas flow by the feedstock hydrocarbon spray.

2. Apparatus for the production of carbon black, comprising:
    means for producing a flow of hot gas;
    a reaction chamber having an outer shell;
    the outer shell having a plurality of flat sides defining an inner surface of the reaction chamber;
    the reaction chamber also having an inlet opening receiving the flow of hot gas and an outlet opening so that the hot gas can flow through the reaction chamber;
    means positioned between the inlet opening and the outlet opening of the reaction chamber for introducing a plurality of feedstock hydrocarbon sprays into the reaction chamber from at least some of the flat sides of the reaction chamber to form a non-circular feedstock hydrocarbon spray pattern at a cross-section of the reaction chamber, and
    the flat sides and the spray means being positioned such that the feedstock hydrocarbon spray pattern formed extends substantially across the entire cross-sectional flow area of the reaction chamber and is not circular in cross section, so as to maximize coverage of the cross-sectional area of the hot gas flow by the feedstock hydrocarbon spray.

3. An apparatus for the production of carbon black as in claim 2 wherein:
    the plural feedstock hydrocarbon sprays each have a predetermined spray angle, and the sprays overlap to form the feedstock hydrocarbon spray pattern.

4. An apparatus for the production of carbon black as in claim 2 wherein:
    the flat sides are even in number,
    each of the flat sides is positioned in substantially parallel and opposing pairs; and
    the means for introducing a plurality of feedstock hydrocarbon sprays into the reaction chamber are positioned on alternate flat sides of the reaction chamber.

5. An apparatus for the production of carbon black as in claim 4, wherein:
    the flat sides are eight in number : and
    the plural feedstock hydrocarbon sprays are four in number, each having a spray angle between 30° and 120°.

6. An apparatus for the production of carbon black as in claim 5 wherein:
    the plural hydrocarbon sprays are four in number, each having a spray angle between 30° and 120°.

7. An apparatus for the production of carbon black as in claim 4, wherein:
    the flat sides are eight in number:
    each of the feedstock hydrocarbon sprays has a spray angle of substantially 90°; and
    the sprays overlap to form a feedstock hydrocarbon spray pattern of substantially rectangular cross-section.

8. Apparatus for the production of carbon black, comprising:
    means for producing a flow of hot gas;
    a reaction chamber having an inlet opening receiving the flow of hot gas and having an outlet opening so that the hot gas can flow through the reaction chamber;
    the reaction chamber having an interior cicumference characterized by a plurality of discrete adjacent surfaces producing a non-circular cross-section for said flow of hot gas; and
    means for introducing feedstock hydrocarbon sprays directed radially into the reaction chamber between at least some of the discrete adjacent surfaces so as to form a non-circular feedstock hydrocarbon spray pattern which substantially conforms to the non-circular cross-section of the reaction chamber,
    thereby maximizing coverage of the cross-sectional area of the hot gas flow by the feedstock hydrocarbon spray.

9. Apparatus as in claim 8, wherein:
    the means for introducing feedstock hydrocarbon sprays is operative to direct those sprays into the reaction chamber on a path at an acute angle to each surface adjacent the sprays so that an outer extent of each such spray lies substantially alongside the adjacent surfaces.

10. Apparatus as in claim 8, wherein:

the reaction chamber further comprises an intermediate circumferential surface interposed between adjacent surfaces, the intermediate surface being shorter than the adjacent surfaces and at an obtuse angle to the adjacent surfaces; and the spray means directs the feedstock hydrocarbon spray radially inwardly from the intermediate surface along a path substantially perpendicular to the intermediate surface with a feedstock hydrocarbon spray pattern which causes an outer extent of the spray to lie substantially alongside the adjacent surfaces.

* * * * *